United States Patent [19]

Michel et al.

[11] Patent Number: 4,830,487

[45] Date of Patent: May 16, 1989

[54] METHOD AND DEVICE FOR SPATIAL LOCATION OF AN OBJECT AND APPLICATION TO FIRING SIMULATION

[75] Inventors: Goujon Michel, Chanteloup les Vignes; Legay J. Francois, Le Mesnil Saint Denis, both of France

[73] Assignee: Giravions Dorand, Suresnes, France

[21] Appl. No.: 750,034

[22] Filed: Jun. 28, 1985

[30] Foreign Application Priority Data

Jul. 9, 1984 [FR] France .................... 84 10875

[51] Int. Cl.⁴ .............................. G01C 3/08
[52] U.S. Cl. ......................... 356/5; 356/141; 434/22; 235/412; 89/41.06
[58] Field of Search ............. 356/1, 4, 5, 141, 152; 434/22; 235/412–415; 89/41.06

[56] References Cited

U.S. PATENT DOCUMENTS

| | | | |
|---|---|---|---|
| 4,174,177 | 11/1979 | Gardner et al. | 356/5 |
| 4,218,834 | 8/1980 | Robertsson | 356/5 |
| 4,229,103 | 10/1980 | Hipp | 356/141 |
| 4,315,689 | 2/1982 | Goda | 356/141 |
| 4,453,825 | 6/1984 | Buck et al. | 356/5 |
| 4,516,853 | 5/1985 | Pearson | 356/141 |
| 4,577,962 | 3/1986 | de Guillenschmidt | 356/5 |
| 4,634,271 | 1/1987 | Jano et al. | 356/5 |

FOREIGN PATENT DOCUMENTS 2121433  8/1972  France .
2087188  5/1982  United Kingdom .

Primary Examiner—M. H. Paschall
Attorney, Agent, or Firm—Felfe & Lynch

[57] ABSTRACT

In a method for locating an object such as a target for firing simulation in which the echo of a radiation beam emitted in the direction of the object and reflected back from the object is detected in the form of an electric signal, the signal is subjected to a correction treatment in order to compensate for variations in detection sensitivity as a function of the distance of the object. The signal treatment primarily consists in imposing on the signal a variable minimum threshold or a constant threshold with a variable preliminary gain. The variations take place in accordance with a predetermined correction law as a function of the time which elapses between emission of the radiation and detection of the echo.

9 Claims, 2 Drawing Sheets

METHOD AND DEVICE FOR SPATIAL LOCATION OF AN OBJECT AND APPLICATION TO FIRING SIMULATION

BACKGROUND OF THE INVENTION

1. Field of the Invention

This invention relates to techniques for locating a target object which call for the use of radiation which is emitted in the direction of the object and detected after back-reflection from this latter.

2. Description of the Prior Art

The highest standards of accuracy are at present achieved by means of radiations of the laser type. Depending on requirements, a locating operation of the above-mentioned type can prove useful either for measuring the distance of the object according to the time taken by the radiation to travel the distance from the emitting source to the object and from the object to the detection system or for determining the angular position of the object with respect to a reference direction, or alternatively for controlling a number of different functions related to the presence of such an object in the field of view in a more complex equipment unit.

In order to gain a precise idea of these possibilities, reference may be made more specifically to applications in the field of firing simulation in order to determine whether the located object constituting the target would or would not have been hit by a real shot corresponding to the same characteristics as the simulated shot. In this sphere of application, it is common practice to employ laser radiation for locating the target in angular position with respect to a reference axis and if necessary for determining its distance. It is also known to impart a scanning movement of small amplitude to the detecting laser beam. This scanning motion has the effect of maintaining the beam "locked" on the target during displacements of this latter.

SUMMARY OF THE INVENTION

The essential aim of the invention is to improve these techniques by better processing of the data which can be supplied by a radiation beam employed for spatial location of an object and more particularly with the full degree of precision which a laser is capable of achieving. To this end, the invention proposes to vary the sensitivity of detection as a function of the distance of the detected object so as to compensate for the incidence of this distance on the angular width of the area in which the presence of the object is to be detected.

The invention is thus directed to a method for locating an object involving detection in the form of an electric signal of the echo of a radiation beam emitted in the direction of the object and reflected from this latter. The distinctive feature of the method lies in the fact that said signal is subjected to a correction treatment in order to compensate for variations in angular range of detection sensitivity as a function of the distance of the object.

A signal treatment of the type mentioned above can consist in particular in imposing on the detection signal a minimum threshold which is variable in a predetermined manner as a function of the radiation transit time which elapses between emission of the beam and detection of the echo and which, as is well known, is representative of the distance between the detected object and the emission and detection equipment. A very similar solution consists in imposing a constant minimum threshold on the signal by subjecting it beforehand to a variable gain in a manner which is predetermine as a function of the same transit time.

The compensation provided by the invention is likely to prove highly useful under many different circumstances. In particular, in the case of firing simulation already mentioned, the signal thus compensated can advantageously be employed for controlling a beam-scanning movement, the intended function of which is to maintain the direction of the beam in a target-object detection situation. The scanning range can accordingly be maintained at a low value, even in the case of targets which are close together. It is in fact apparent in this case that there is no advantage to be gained by scanning the field of view at an angle which, in respect of a non-compensated detection sensitivity, would be wider as the target is closer whereas accuracy of determination of the angular position of the target would at the same time be reduced. It is in any case possible to establish the laws of variation in threshold or in gain as a function of the distance (or of the time of transit of radiation between emission, target and detection), with the result that the angular divergence of the scanning movement is substantially constant irrespective of the distance of the target.

It will be already understood, however, that the invention extends to all applications of the target-location method defined in the foregoing. The invention also extends to devices comprising all suitable means for carrying out said method.

BRIEF DESCRIPTION OF THE DRAWINGS

Other features of the invention will be more apparent upon consideration of the following description and accompanying drawings, wherein.

DESCRIPTION OF THE PREFERRED EMBODIMENTS

In firing simulators, it is standard practice to employ laser-beam detection for locating a target both in angular position with respect to the simulator and in distance of the simulator from the target, and to utilize the results of this target location for making a comparison with the trajectory of a simulated projectile or missile which makes it possible to determine whether the corresponding shot is correct or in other words whether a real shot conforming to the same characteristics would have hit the target or not. French Pat. No. 81 11574 gives a detailed description of a firing simulation system. In addition, this patent specification explains how the target is continuously tracked after detection by subjecting the same laser beam to a scanning movement of small amplitude in the vicinity of the target. The beam scan is in fact controlled in such a manner as to produce a rearward return of the movement each time the beam no longer detects the presence of the target.

Figure 1:
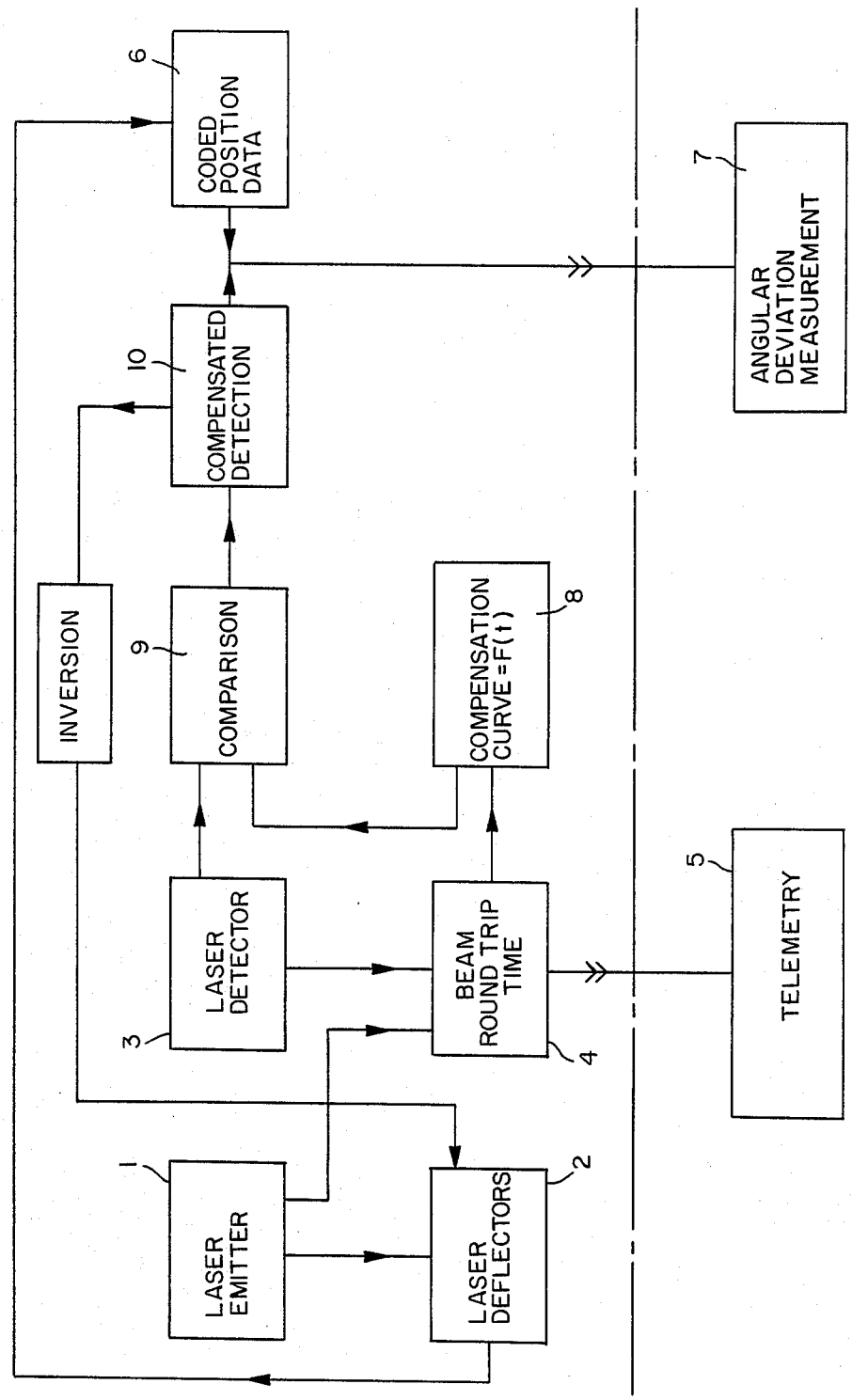
FIG. 1 is a flow diagram showing the different steps of the method described.

As shown in FIG. 1, the essential equipment comprises a laser source 1, deflectors 2 which serve to subject the direction of emission of the laser beam to a scanning movement along two perpendicular axes, and a laser detector 3 which is sensitive to the echo received after back-reflection from the target when the direction of the laser beam is suitably oriented.

The problem now solved by the invention relates to the variation in response of the laser detector according as the target detected is more or less close or more or less distant. This distance from target to detector is expressed in a conventional manner by the time taken by the laser radiation to perform a round-trip traversal over the distance from emission source to target, and back from this latter to the detection unit. This transit time is detected at 4 in FIG. 1 in the form of a time signal which is then transmitted to a telemeter 5 and this latter converts said signal in order to represent the results directly as values of distance.

It is customary practice to represent the variations in detection sensitivity as a function of the target distance by what are known as detection indicatrices. These are curves which represent by means of bulged sensitivity lobes the area over which detection is possible by means of a predetermined equipment unit. Strictly speaking, rather than use the term sensitivity, it is in fact more appropriate to speak of detectability, that is, the capacity of the equipment for target detection by laser emission-reception. There are thus shown in FIG. 2 three detection indicatrices each in respect of a predetermined target position. Thus the indicatrix 11 having the greatest length is for the short-distance target; the most compact indicatrix 13 is for the long-distance target; and the intermediate indicatrix 12 corresponds to a medium-distance target position. Angular deviations, namely those of the target or those of the laser beam are expressed by relative displacements on each side of the axis of indicatrices whilst the intensity of response to detection is plotted along this axis.

Referring now to FIG. 1, it is apparent that the deflectors 2 having a laser-beam scanning function transmit a signal to a coding device 6 for producing a coded position datum which characterizes the position of the laser beam in elevation and in azimuth at each instant. In conventional simulators, this item of information or datum is transmitted to an angular deviation measurement device 7 in response to an echo detection signal which represents the simultaneous reception of an echo by the laser detector 3. The angular deviation measurement device 7 thus indicates the angular position of the target. When echo detection is utilized for continuous tracking of the target by the laser beam, a complementary device (not shown in the drawings) initiates the return of the scanning movement as soon as the detector 3 no longer receives the echo by means of a system for controlling the deflectors in dependence on the same echo detection signal as in the foregoing. An object of the present invention is precisely to effect a preliminary correction of this echo detection signal as will hereinafter be explained in greater detail.

Figure 2:
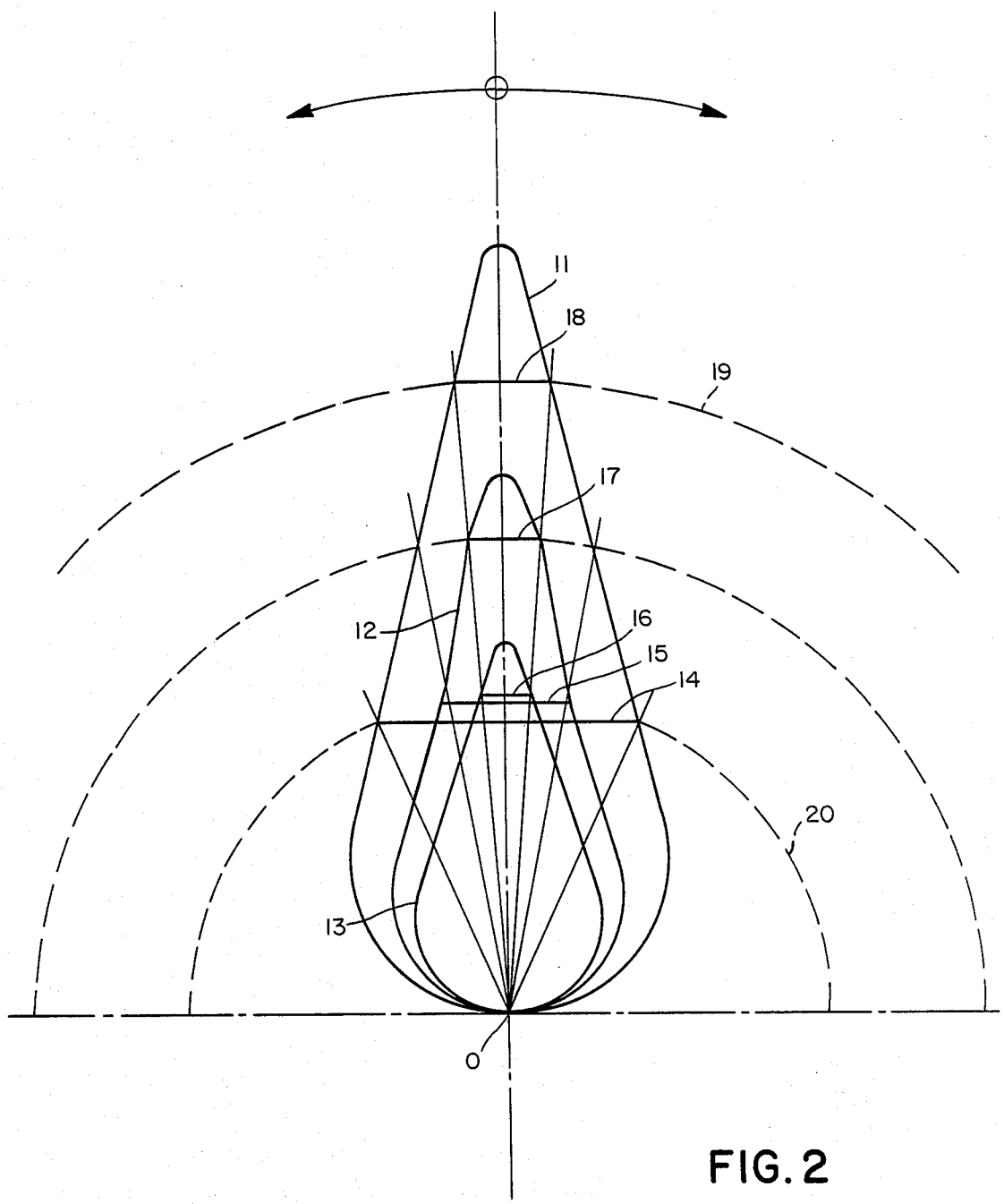
FIG. 2 is a diagram of detection indicatrices in respect of target objects at different distances and will serve to explain the usefulness of the method of detection in accordance with the invention as applied to the field of firing simulation.

The angular divergence or range of the scanning movement is expressed in FIG. 2 by the angular displacements of the beam about the origin 0 or point of emission of the beam. Between the extreme orientations in which the echo continues to be received, the widths "seen" by the detection indicatrices are represented by the segments 14, 15 and 16 respectively in the case of the three indicatrices, namely the short-distance, medium-distance and long-distance indicatrices, when use is made of a conventional simulator. The degree of accuracy in detection of the angular position of the targe proves to be highly variable according to the distance of said target and the quality of the aim cannot be assessed in the case of targets located close together.

In order to overcome these disadvantages, the invention makes it possible to transfer the width seen by each indicatrixtto its extremity. To this end, the echo detection signal is subjected to a correction treatment which, by means of the device 10 in FIG. 1, provides at least partial compensation for the variations in detectability or sensitivity of detection as a function of the target distance. By suitable calibration of the correction law, it is even possible to ensure that the widths seen by the indicatrices are located at 16, 17, 18 : this corresponds to an angular scanning range which remains constant when the target comes progressively closer to the simulator.

This result is obtained by imposing on the laser echo detection signal a minimum amplitude threshold which varies according to the distance of the target or more precisely according to the transit time of the laser beam detected at 4. This threshold is relatively high in the case of a short transit time (curve 19 in FIG. 2) and relatively low in the case of long transit times (curve 20) The law governing the variations in threshold as a function of the transit time is established by preliminary calibration and recorded at 8 (FIG. 1).

The signal representing the transit time which is delivered at 4 is transmitted at 8 for selection of the corresponding threshold. At 9, the echo detection signal delivered by the laser detector 3 is compared with the threshold signal delivered by the device 8 and is transmitted by means of the device 10 in order to constitute the corrected echo detection signal to be subsequently employed, only on condition that its amplitude is higher than the selected threshold value.

By way of alternative to the foregoing, the same correction can be performed by maintaining the minimum threshold value imposed on the final echo detection signal at a relatively low but constant value and by increasing the amplitude of the initial signal derived from the laser detector 3 by a gain whose value varies according to the laser beam transit time which has been detected. The law of variation of the gain as a function of time as imposed by a device which is similar to the device 8 of FIG. 1 then corresponds to an increase in gain with time and therefore in the distance of the target.

It is apparent that, as in the case of the previous solution, the effect of the alternative embodiment just mentioned is that a corrected echo detection signal is obtained in respect of bemm orientations located within an angle of divergence which remains substantially constant for all target distances within a predetermined range.

The invention is clearly not limited in any respect to the distinctive features specified in the foregoing or to the details of the particular embodiment which has been chosen for the purpose of illustrating the invention. In regard to the particular embodiment hereinabove described by way of example as well as it constituent elements, all types of variants may be contemplated without thereby departing either from the scope or the spirit of the invention, which thus includes all equivalent means.

What is claimed is:

1. A method for spatial location of an object comprising:

detecting in the form of an electric signal an echo of a beam of radiation submitted to a scanning movement, thereby moving in an angular aperture in the vicinity of the object, said beam being reflected by said object;

detecting the round-trip transit time of said beam corresponding to the distance to the object;

submitting said signal to a correction treatment as a function of the distance to the object in order to compensate for variations in detection sensitivity of said signal, said correction treatment providing a compensated detection signal in the view of said transit time;

controlling by said compensated detection signal an angular aperture, having an angle, of said scanning movement and a scanning inversion each time the beam no longer detects the object, the angle of said angular aperture of said scanning remaining constant whatever the distance to the object.

2. A method according to claim 1, comprising:

imposing as the correction treatment a minimum threshold on the echo detection signal, said minimum threshold being variable in a predetermined manner as a function of rediation transit time which elapses between emission of the beam and detection of the echo.

3. A method according to claim 1, comprising:

imposing as the correction treatment a constant minimum threshold on the echo detection signal by subjecting said signal beforehand to a gain which is variable in a predetermined manner as a function of radiation transit time which elapses between emission of the beam and detection of the echo.

4. A method according to claim 3, cmmprising:

determining a law of correction by variation of the threshold or of the gain by calibration so as to obtain an echo detection signal corrected for beam orientations located within an angle of an angular aperture which angle remains substantially constant in respect of all distances of said object within a predetermined range.

5. A method according to claim 4, wherein said radiation is of the laser type.

6. A device for spatial location of an object comprising:

a radiation beam emitter;

means for submitting said beam to a scanning movement, thereby moving in an angular aperture in the vicinity of the object;

detection means which is responsive to an echo of said radiation beam relected back from said object for delivering an echo detection signal;

means for detecting the radiation transit time of said beam corresponding to the distance to the object;

means for submitting said signal to a correction treatment as a function of the distance to the object in order to compensate for variations in detection sensitivity of said signal, said means for submitting said signal to a correction treatment providing a compensated detection signal;

means for controlling by said compensated detection signal an angular aperture, having an angle, of said scanning movement and a scanning inversion each time the beam no longer detects the object, the angle of said angular aperture of said scanning movement remaining constant whatever the distance to the object.

7. A device according to claim 6, wherein said device comprises means for computing the distance of the object from said transit time.

8. A device according to claim 7, wherein said device comprises means for detecting the orientation of the beam under the control of said echo detection signal after correction.

9. A device according to claim 6 which comprises a firing simulator for locating the position of a target constituting said object.

* * * * *